Aug. 15, 1961 J. R. WHITE 2,996,572

DETECTOR SYSTEM PARTICULARLY FOR COLOR-TELEVISION RECEIVERS

Filed Feb. 23, 1956 2 Sheets-Sheet 1

United States Patent Office 2,996,572
Patented Aug. 15, 1961

2,996,572

DETECTOR SYSTEM PARTICULARLY FOR COLOR-TELEVISION RECEIVERS

John R. White, Westbury, N.Y., assignor to Hazeltine Research, Inc., Chicago, Ill., a corporation of Illinois Filed Feb. 23, 1956, Ser. No. 567,135
6 Claims. (Cl. 178—5.4)

*General*

Figure 1:
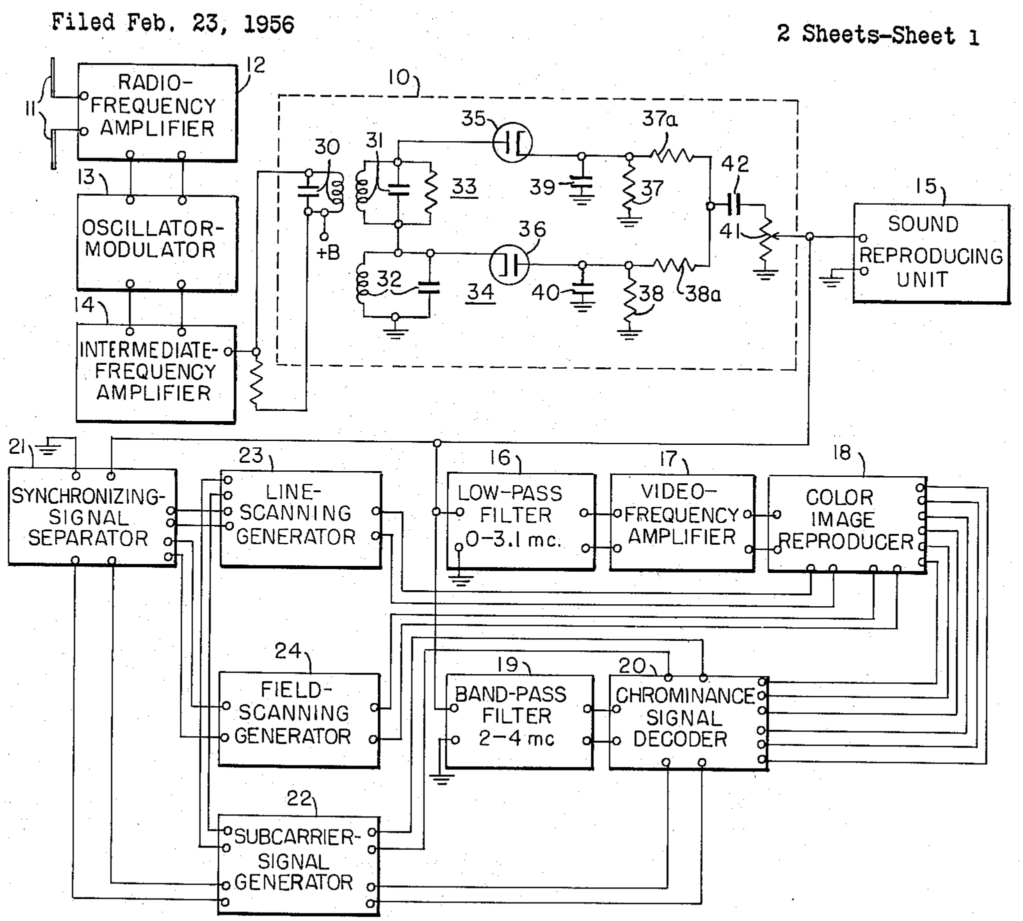

This invention relates to detector systems for modulated wave signals and, more particularly, to detector systems for televised color picture wave signals.

Heretofore, color-television receivers employing linear envelope picture-signal detectors, in general, have been subject to picture distortion inherently caused by such a detector upon the application thereto of an intermediate-frequency signal modulated by a composite video signal having luminance and chrominance components. In particular, the reproduced picture ordinarily suffers luminance distortion, namely, luminance suppression in negative modulation transmission systems. This distortion arises because the presence of a single-side-band chrominance subcarrier signal at the detector causes an effective envelope variation of the luminance carrier signal. The detector responds to this envelope variation and, therefore, develops a distortion component. Further, single-side-band reception of the chrominance subcarrier on the picture carrier signal causes a chrominance distortion component which results in a suppression of the chrominance of the reproduced picture. Also, in receivers of the intercarrier type, the sound carrier signal is applied to the picture-signal detector and its presence together with the chrominance subcarrier signal causes the detector to derive a 920-kilocycle luminance distortion component.

As explained in a copending application of Bernard D. Loughlin, Serial No. 447,762, entitled "Picture-Signal Deriving System," and filed August 4, 1954, an exalted carrier color-television receiver is effective to minimize the 920-kilocycle luminance distortion component. Such a receiver is also effective to minimize luminance suppression.

Because the exaltation of the carrier signal affects the the relative gains of the low-frequency and high-frequency modulation components, the ultimately desired gain relation must be restored. As explained in the above-mentioned Loughlin application, relative gain compensation may be effected in the video-frequency stages by proper selection of a nonuniform over-all frequency-response characteristic for these stages. However, this may involve a more critical and more expensive design of the video-frequency stages than may be desirable for some applications.

In accordance with the present invention, relative gain compensation of the high-frequency and low-frequency modulation components is effected in the detector circuit, thereby eliminating the necessity for a selection of a nonuniform video-frequency response characteristic.

It is an object of the present invention, therefore, to provide a new and improved detector system for modulated wave signals which avoids one or more of the above-mentioned disadvantages and limitations of prior such systems.

It is another object of the invention to provide a new and improved detector system for televised color picture wave signals in which picture distortion is minimized.

It is another object of the invention to provide a new and improved detector system for televised color picture wave signals in which luminance distortion is minimized.

It is another object of the invention to provide a new and improved detector system for televised color picture wave signals in which chrominance distortion is minimized.

It is another object of the invention to provide a new and improved detector system for televised color picture wave signals in which a 920-kilocycle luminance distortion component is minimized.

It is another object of the invention to provide a new and improved linear envelope detector system for televised color picture wave signals of simple and inexpensive construction.

It is another object of the invention to provide a new and improved linear envelope detector system for televised color picture wave signals having a single output circuit for luminance and chrominance components.

It is another object of the invention to provide a new and improved exalted carrier detector system for a color-television receiver in which the need for a nonuniform frequency-response characteristic of the video-frequency stages is eliminated.

In accordance with a particular form of the invention, a detector system for modulated wave signals, subject to output signal distortion introduced by an applied single-side-band signal component, comprises circuit means for supplying a modulated carrier wave signal, its high-frequency and low-frequency modulation components, and a single-side-band component spaced from the carrier signal effectively as a high-frequency modulation component. The system also includes a plurality of detector circuit means coupled to the aforesaid supply circuit means including a wide band detector circuit having an exalted response to the carrier signal and the low-frequency modulation components with respect to the high-frequency modulation components and including a narrow band detector circuit having a response substantially only to the carrier signal and the low-frequency modulation components for deriving the modulation components with substantially reduced distortion introduced by the single-side-band component. The detector system also includes circuit means included in the detector circuits for combining proportions of the derived components of opposite sense for reducing substantially the over-all ratio of response to the wide band detector circuit to the low-frequency modulation components of the carrier signal with respect to response to the high-frequency modulation components, thereby imparting to the system an over-all desired pass band while the system derives an output signal with substantially reduced distortion.

For a better understanding of the present invention, together with other and further objects thereof, reference is had to the following description taken in connection with the accompanying drawings, and its scope will be pointed out in the appended claims.

Referring to the drawings:

FIG. 1 is a circuit diagram, partly schematic, of a color-television receiver including a detector system constructed in accordance with the invention, and FIGS. 2*a*–2*g*, inclusive, are graphs to aid in explaining the operation of the detector system of the FIG. 1 receiver.

*General description and explanation of operation of Fig. 1 receiver*

Referring now more particularly to FIG. 1 of the drawings, the color-television receiver there represented may be of conventional construction with the exception of the detector system 10 which is constructed in accordance with the invention. For example, the receiver may be of a constant luminance type described and claimed in a copending application of Bernard D. Loughlin, Serial No. 159,212, filed May 1, 1950, and entitled "Color-Television System." Receivers of this type are further described in the October 1951 issue of the Proceedings of the I.R.E. in an article entitled "Recent Improvements in Band-Shared Simultaneous Color-Television Systems," by Loughlin, and in an article by Hirsch, Bailey, and Loughlin entitled "Principles of NTSC Compatible Color Television," Electronics, February 1952.

The FIG. 1 receiver comprises an antenna system 11, 11 to which are coupled, in cascade and in the order named, a radio-frequency amplifier 12, an oscillator-modulator 13, and an intermediate-frequency amplifier 14, all of conventional construction, for deriving an intermediate-frequency composite color-television signal. The detector system 10, constructed in accordance with the invention and more fully described subsequently, is coupled to intermediate-frequency amplifier 14 for deriving from the intermediate-frequency signal applied thereto a composite video signal including luminance and chrominance components as well as a sound carrier signal. The output circuit of the detector system 10 is coupled to a sound-reproducing unit 15 of conventional construction. The output circuit of the detector system 10 is also coupled to a luminance channel and to a chrominance channel of the receiver. The luminance channel includes a low-pass filter 16 having a pass band of, for example, 0–3.1 megacycles and coupled through a video-frequency amplifier 17 to a color image reproducer 18, all of conventional construction. The filter 16 rejects the chrominance subcarrier signal while translating the luminance signal for amplification by the amplifier 17 and application to the reproducer 18 in a usual manner.

The chrominance channel of the receiver includes a band-pass filter 19 having a pass band of, for example, 2–4 megacycles coupled to a chrominance-signal decoder 20 of conventional construction for deriving, for example, $R-Y$, $G-Y$, and $B-Y$ chrominance signals for application to the reproducer 18.

The output circuit of the detector system 10 is also coupled to a synchronizing-signal separator 21 for separating the line-synchronizing and field-synchronizing signals from the video-frequency signals applied thereto by the system 10. One output circuit of the separator 21 is coupled to a gated input circuit of a stabilized subcarrier signal generator 22 of the conventional phase-controlled oscillator design and responsive to the color burst synchronizing signal. The unit 22 has a pair of output circuits connected to input circuits of the chrominance-signal decoder 20 for providing a pair of phase-displaced unmodulated subcarrier signals, for example, signals in phase quadrature which individually beat with the modulated signal component applied to the decoder 20 by the filter 19 to derive in the decoder 20 the $R-Y$, $G-Y$, and $B-Y$ color-difference signals.

The receiver also includes line-scanning and field-scanning generators 23 and 24 connected in a conventional manner to separator 21 and to the scanning circuits of the color image reproducer 18 for effecting scanning. The output circuit of the line-scanning generator 23 is also connected to the gated circuit of the subcarrier signal generator 22 for separating the color burst synchronizing signal by means of a gating operation to control the oscillator phase.

*Description of detector system of Fig. 1 receiver*

Considering now the detector system 10 in detail, the detector system comprises circuit means for supplying a modulated carrier wave signal, its high-frequency and low-frequency components, and a single-side-band component spaced from the carrier signal effectively as a high-frequency modulation component. More particularly, the circuit means preferably comprises wide band tuned circuit means for supplying a vestigial side-band modulated picture carrier wave signal, its high-frequency and low-frequency luminance modulation components, and a single-side-band chrominance subcarrier component spaced from the carrier signal as a high-frequency modulation component. This circuit means preferably comprises a tuned circuit 30 connected to the output circuit of the intermediate-frequency amplifier 14 and its associated secondary tuned circuit 31 inductively coupled thereto. The tuned circuits 30, 31 ordinarily jointing have a ratio of response to the picture carrier signal with respect to response to the chrominance subcarrier component which is less than unity and also are capable of supplying a sound carrier signal.

There is also provided a narrow band tuned circuit means for supplying the picture carrier signal and its low-frequency modulation components. This circuit means is a tuned circuit 32 inductively coupled to the tuned circuit 30. The frequency-response characteristics of the various tuned circuits will be considered in greater detail subsequently.

The detector system also includes a plurality of detector circuits coupled to the supply circuit means and having, relative to each other, different ratios of response to the carrier signal and to its low-frequency modulation components with respect to high-frequency modulation components for deriving the modulation components with substantially reduced distortion introduced by the single-side-band component. The detector circuits have different relative proportions of low-frequency exaltation. More particularly, the detector circuits comprise a first linear envelope detector circuit 33 coupled to the wide band tuned circuit means 30, 31 and to the narrow band tuned circuit means 32 and a second linear envelope detector circuit 34 coupled to the narrow band tuned circuit means 32. The detector circuit 34 is a low distortion circuit because the narrow band tuned circuit means 32 does not respond appreciably to the chrominance subcarrier component. The detector circuits 33, 34 include a pair of video-frequency modulation circuits and a pair of diodes 35, 36 oppositely poled between the supply circuit means and the load circuits. The load circuit of the detector circuit 33 associated with the diode 35 comprises resistor 37 and carrier-frequency by-pass condenser 39. The load circuit of the detector circuit 34 comprises resistor 38 preferably of the same value as resistor 37 and carrier-frequency by-pass condenser 40. The load circuits also include isolating resistors 37*a* and 38*a* preferably having the same large impedance value relative to resistors 37 and 38 and coupled through a condenser 42 to a suitable gain control comprising an adjustable voltage divider 41.

The video-frequency load circuits just described serve as circuit means included in the detector circuits for combining proportions of the derived components having proportions of exaltation of opposite sense for reducing substantially the over-all ratio of response to the low-frequency modulation components of the carrier signal with respect to response to the high-frequency modulation components, thereby imparting to the system an over-all desired pass band while the system derives an output signal with substantially reduced distortion. Other equivalent load circuits may be employed, if desired, which eliminate one or more of the load resistors.

It should be noted that for some applications it may not be necessary that the picture carrier signal be exalted with respect to its high-frequency modulation components but merely that it be exalted with respect to its value normally associated with a second detector of a color-television receiver. For such applications, the supply circuit means has at carrier frequency a ratio of response to the picture carrier signal with respect to response to the chrominance subcarrier component which is less than unity and the detector circuits then have different ratios of response to the picture carrier signal with respect to response to the chrominance subcarrier component which are greater than the aforesaid response ratio of the supply circuit means. The video-frequency load circuit means then are effective to combine at video frequency proportions of derived components of opposite sense for reducing to the original ratio of the supply circuit means the over-all ratio of response to the picture carrier signal with respect to response to the chrominance subcarrier component.

*Operation of detector system of FIG. 1 receiver*

Figure 2A:
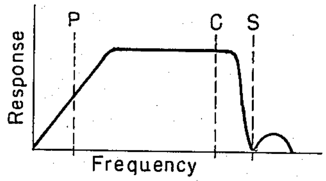

Considering now the operation of the detector system 10 in detail, the intermediate-frequency amplifier 14 applies to the detector system by means of tuned circuits 30, 31 a picture carrier signal, its high- and low-frequency modulation components including a chrominance subcarrier signal, and also supplies a sound carrier signal. The effective frequency-response characteristic of the tuned circuit 31 is represented in FIG. 2*a* where broken lines P, C, and S represent the picture carrier frequency, the chrominance subcarrier frequency, and the sound carrier frequency, respectively. The effective frequency-response characteristic represented in FIG. 2*a* may, if desired, be partially determined by the tuned circuit 30 and other tuned circuits (not shown) in the intermediate-frequency amplifier 14. It will be understood that several tuned circuits in cascade jointly providing a given resultant frequency-response characteristic are equivalent to a single tuned circuit providing that characteristic.

As represented in FIG. 2*a*, the response of the tuned circuit 31 at the picture carrier frequency has half the value of the response of the tuned circuit 31 at the chrominance subcarrier frequency. This frequency-response characteristic is, therefore, representative of a conventional frequency-response characteristic of the input circuit of a conventional second detector of a color-television receiver. The response at the picture carrier frequency is designed to be less than the response at the chrominance subcarrier frequency to compensate for the vestigial side-band transmission of the modulation components of the picture carrier signal. This compensation is ordinarily provided in the intermediate-frequency circuits of a color-television receiver in order that the video-frequency amplifier following the second detector may be designed to have a substantially uniform frequency-response characteristic.

In a conventional detector circuit of a color-television receiver the single-side-band chrominance subcarrier signal component causes an effective envelope variation of the picture carrier signal. This envelope variation is not sinusoidal and has a direct-current component which alters the luminance level represented by the direct-current component of the picture carrier signal. In a negative modulation system, the direct-current component of the envelope variation is of such polarity relative to the detected luminance component that it reduces the luminance level and causes a luminance suppression in the reproduced image. When the amplitude of the picture carrier signal is large relative to the amplitude of the chrominance subcarrier signal component, the envelope variation of the picture carrier signal becomes more nearly sinusoidal and the direct-current component which alters the luminance level becomes smaller. Likewise, the fundamental subcarrier distortion component which alters the chrominance component becomes smaller. Similarly, as explained in the previously mentioned copending Loughlin application Serial No. 447,762, when the picture carrier signal has a large amplitude relative to the chrominance subcarrier signal component and to the sound carrier signal, the beat note between the chrominance subcarrier signal and the sound carrier signal becomes less noticeable in the reproduced image. Accordingly, exaltation of the picture carrier signal prior to detection is effective to minimize distortion caused by the single-side-band relation of the chrominance signal subcarrier component and the sound carrier signal with respect to the picture carrier signal. However, it has heretofore been considered necessary to compenate for such exaltation of the picture carrier signal in the video-frequency amplifier stages which involves a more critical design of those stages than may be desirable for some applications.

Figure 2B:
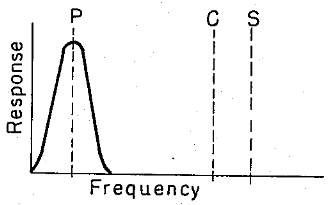
Figure 2E:
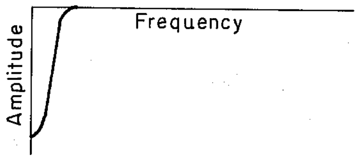
Figure 2C:
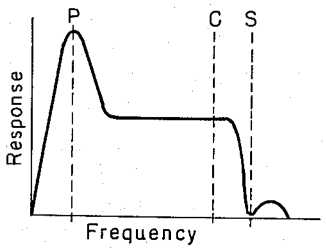

Applicant's circuit provides exaltation of the picture carrier signal by means of tuned circuit 32, having the frequency-response characteristic represented in FIG. 2*b*, and provides compensation for the exaltation of the picture carrier signal in the detector system by means of the two detector circuits 33 and 34, as presently to be explained.

Figure 2F:
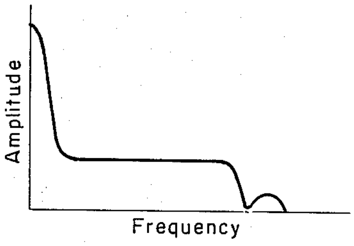
Figure 2D:
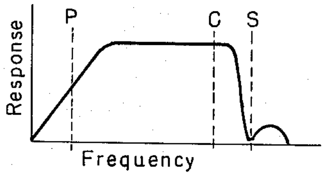

The detector circuit 33 is responsive to the signals developed in the resonant circuits 31 and 32 in series. The resonant circuits 31 and 32 in series have a combined frequency-response characteristics represented in FIG. 2*c* which represents the sum of the frequency-response characteristics of FIGS. 2*a* and 2*b*. The diode 35 derives the modulation components of the picture carrier signal in the video-frequency load circuit 37, 39. Assuming, for example, a wide band constant amplitude modulation component of the picture carrier signal. FIG. 2*f* then represents the low-frequency modulation components derived by the diode 35 which are exalted with respect to the high-frequency modulation components. In connection with FIG. 2*f*, vestigial side-band modulation results in the presence of only single-side-band high-frequency modulation components and causes the high-frequency modulation components to appear at half the amplitude level at which corresponding double-side-band modulation components would be derived.

Figure 2G:
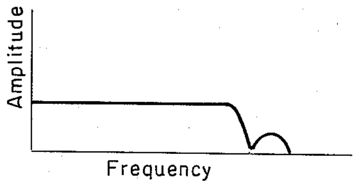

The diode 36 of the detector circuit 34 derives the low-frequency modulation components in the video-frequency load circuit 38, 40 with opposite polarity to the low-frequency modulation components derived by the detector circuit 33. Equal proportions of the modulation components derived by detectors 33 and 34 are combined across resistor 41 via resistors **37*a* and 38*a*. The exaltation of the low-frequency modulation components caused by the presence of the tuned circuit 32 in the detector circuit 33 is, therefore, canceled by the low-frequency modulation components derived with opposite polarity in the detector circuit 34** and represented in FIG. 2*e*. The over-all frequency-response characteristic of the detector system is, therefore, represented by the curve of FIG. 2*d* which corresponds to the curve of FIG. 2*a* representing the frequency-response characteristic of the tuned circuit 31. The amplitude of the resultant video-frequency signal representing the assumed wide band constant amplitude video-frequency modulation component of the picture carrier signal is represented by the curve of FIG. 2*g*.

From the foregoing description it will be apparent that a detector system constructed in accordance with the invention has the advantage that it minimizes picture distortion ordinarily caused by a linear envelope detector detecting single-side-band modulation components. It also has a common output circuit for both luminance and chrominance components so that a single gain control may be provided.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A detector system for modulated wave signals, subject to output signal distortion introduced by an applied single-side-band signal component, comprising: circuit means for supplying a modulated carrier wave signal, its high-frequency and low-frequency modulation components, and a single-side-band component spaced from said carrier signal effectively as a high-frequency modulation component; a plurality of detector circuit means coupled to said supply circuit means including a wide band detector circuit having an exalted response to said carrier signal and said low-frequency modulation components with respect to said high-frequency modulation components and including a narrow band detector circuit having a response substantially only to said carrier signal and said low-frequency modulation components for deriving said modulation components with substantially reduced distortion introduced by said single-side-band component; and circuit means included in said detector circuits for combining proportions of said derived components of opposite sense for reducing substantially the over-all ratio of response of said wide band detector circuit to said low-frequency modulation components of said carrier signal with respect to response to said high-frequency modulation components, thereby imparting to the system an over-all desired pass band while the system derives an output signal with substantially reduced distortion.

2. A detector system for modulated wave signals, subject to output signal distortion introduced by an applied single-side-band signal component, comprising: circuit means for supplying a modulated carrier wave signal, its high-frequency and low-frequency modulation components, and a single-side-band component spaced from said carrier signal effectively as a high-frequency modulation component; a plurality of detector circuit means coupled to said supply circuit means including a wide band detector circuit having an exalted response to said carrier signal and said low-frequency modulation components with respect to said high-frequency modulation components and including a narrow band detector circuit having a response substantially only to said carrier signal and said low-frequency modulation components for deriving said modulation components with substantially reduced distortion introduced by said single-side-band component, said wide band and narrow band detector circuits having a common carrier frequency input circuit providing said exalted response; and video-frequency load circuit means included in said detector circuits for combining at video frequency proportions of said derived components having proportions of exaltation of opposite sense for reducing substantially the over-all ratio of response of said wide band detector circuit to said low-frequency modulation components of said carrier signal with respect to response to said high-frequency modulation components, thereby imparting to the system an over-all desired pass band while the system derives an output signal with substantially reduced distortion.

3. In a color-television receiver, a detector system for modulated wave signals, subject to output signal distortion introduced by an applied single-side-band signal component, comprising: circuit means for supplying a modulated picture carrier wave signal, its high-frequency and low-frequency luminance modulation components, and a single-side-band chrominance subcarrier component spaced from said carrier signal as a high-frequency modulation component; a plurality of detector circuit means coupled to said supply circuit means including a wide band detector circuit having an exalted response to said carrier signal and said low-frequency modulation components with respect to said high-frequency modulation components and including a narrow band detector circuit having a response substantially only to said carrier signal and said low-frequency modulation components for deriving said modulation components with substantially reduced distortion introduced by said chrominance subcarrier component; and circuit means included in said detector circuits for combining proportions of said derived components of opposite sense for reducing substantially the over-all ratio of response of said wide band detector circuit to said low-frequency modulation components of said carrier signal with respect to response to said high-frequency modulation components, thereby imparting to the system an over-all desired pass band while the system derives an output signal with substantially reduced distortion.

4. In a color-television receiver, a detector system for modulated wave signals, subject to output signal distortion introduced by an applied single-side-band signal component, comprising: circuit means for supplying a modulated picture carrier wave signal, its high-frequency and low-frequency luminance modulation components, and a single-side-band chrominance subcarrier component spaced from said carrier signal as a high-frequency modulation component; a pair of linear envelope detector circuit means coupled to said supply circuit means including a wide band detector circuit having an exalted response to said carrier signal and said low-frequency modulation components with respect to said high-frequency modulation components and including a narrow band detector circuit having a response substantially only to said carrier signal and said low-frequency modulation components for deriving said modulation components with substantially reduced distortion introduced by said chrominance subcarrier component; and circuit means included in said detector circuits for combining proportions of said derived components of opposite sense for reducing substantially the over-all ratio of response of said wide band detector circuit to said low-frequency modulation components of said carrier signal with respect to response to said high-frequency modulation components, thereby imparting to the system an over-all desired pass band while the system derives an output signal with substantially reduced distortion.

5. In a color-television receiver, a detector system for modulated wave signals, subject to output signal distortion introduced by an applied single-side-band signal component, comprising: circuit means for supplying a modulated picture carrier wave signal, its high-frequency and low-frequency luminance modulation components, and a single-side-band chrominance subcarrier component spaced from said carrier signal as a high-frequency modulation component; a pair of linear envelope detector circuit means including a pair of video-frequency load circuits and a pair of diodes oppositely poled between said supply circuit means and said load circuits and said pair of linear envelope detector circuit means including a wide band detector circuit having an exalted response to said carrier signal and said low-frequency modulation components with respect to said high-frequency modulation components and including a narrow band detector circuit having a response substantially only to said carrier signal and said low-frequency modulation components for deriving said modulation components with substantially reduced distortion introduced by said chrominance subcarrier component; and said video-frequency load circuits being effective to combine proportions of said derived components of opposite sense for reducing substantially the over-all ratio of response of said wide band detector circuit to said low-frequency modulation components of said carrier signal with respect to response to said high-frequency modulation components, thereby imparting to the system an over-all desired pass band while the system derives an output signal with substantially reduced distortion.

6. In a color-television receiver, a detector system for modulated wave signals, subject to output signal distortion introduced by an applied single-side-band signal component, comprising: circuit means for supplying a modulated picture carrier wave signal, its high-frequency and low-frequency luminance modulation components, and a single-side-band chrominance subcarrier component spaced from said carrier signal as a high-frequency modulation component and for supplying a sound carrier signal; a plurality of detector circuit means coupled to said supply circuit means including a wide band detector circuit having an exalted response to said carrier signal and said low-frequency modulation components with respect to said high-frequency modulation components and including a narrow band detector circuit having a response substantially only to said carrier signal and said low-frequency modulation components for deriving said modulation components with substantially reduced distortion introduced by said chrominance subcarrier component and said sound carrier signal; and circuit means included in said detector circuits for combining proportions of said derived components of opposite sense for reducing substantially the over-all ratio of response of said wide band detector circuit to said low-frequency modulation components of said carrier signal with respect to response to said high-frequency modulation components, thereby imparting to the system an over-all desired pass band while the system derives an output signal with substantially reduced distortion.

References Cited in the file of this patent

UNITED STATES PATENTS

| | | |
|---|---|---|
| 2,771,552 | Lynch | Nov. 20, 1956 |
| 2,861,180 | Sonnenfeldt | Nov. 18, 1958 |

OTHER REFERENCES

RCA Model CT–100, pages 31 and 32, Mar. 31, 1954. (Copy in Div. 16.)

RCA Model 700, page 10, 1956. (Copy in Div. 16.)

Crosby: "Exalted-Carrier Amplitude and Phase Modulation Reception," Proceedings of the I.R.E., September 1945, pages 581–591.

"Homodyne Reception," Wireless World, April 1942, pages 87–89.